United States Patent Office 3,338,176
Patented Aug. 29, 1967

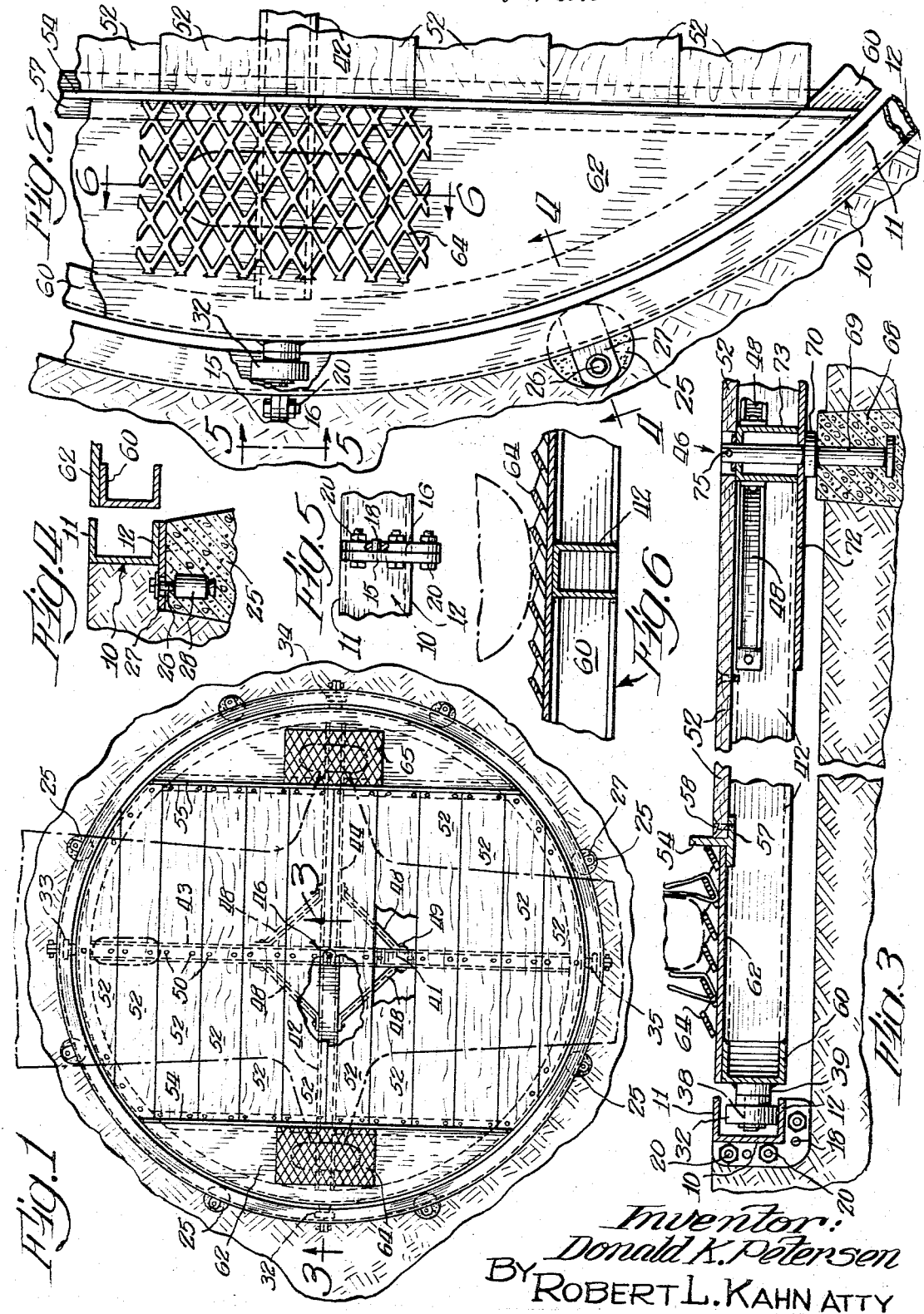

---

3,338,176
PLANE ANCHORAGE
Donald K. Petersen, Wauconda Township, Ill.
(1104 S. Fisher Road, McHenry, Ill. 60050)
Filed July 9, 1965, Ser. No. 470,841
5 Claims. (Cl. 104—35)

ABSTRACT OF THE DISCLOSURE

This invention provides a turntable structure upon which a plane can be parked. The structure for supporting the turntable includes a circular channel having a vertical web and flanges extending inwardly. Rollers for carrying the turntable ride on the lower flange which the upper flange prevents tilt. When a plane is tied to the turntable, plane buoyancy in response to wind effectively reduces plane weight on the turntable rollers and makes it easier for the turntable to respond. Thus the turntable will turn the plane into the wind and the plane can withstand maximum velocity winds for which it was designed to fly.

---

This invention relates to a plane anchorage and, in particular, to a means for anchoring small private planes in the open.

It is well known that many small private planes are parked in the open rather than in hangars usually for temporary periods. Such small planes—and by small plane is meant a plane having a wing span of no more than about 40 feet and weight (unloaded) of no more than about 3,000 pounds. Such small planes when parked in the open are tied down and blocked so that the craft is substantially immovable on the ground. There have been many instances where a plane parked in this fashion has been wrecked or severely damaged by sudden gusts of wind having velocities of the order of 75 miles per hour and up.

A plane that can travel through air at speeds of 75 or more miles per hour can easily withstand gusts or steady winds of such velocity providing that the plane faces into the wind. This invention provides a simple and effective turntable upon which a small plane may be readily attached or parked and can easily adapt itself to wind conditions which would normally wreck or damage a plane when not free to head into the wind. The means hereinafter described has the desirable property of reducing the force required to turn the plane into the wind as the wind velocity increases. Consequently, a plane anchorage embodying the present invention can hold a plane against any wind whose velocity is of the same general order as the maximum air speed for which the plane in question is designed to operate.

A construction embodying the present invention is characterized by mechanical simplicity as well as by ease of assembly and is susceptible to being shipped in knocked down condition through conventional transport means. The anchorage embodying the invention may be readily assembled and put into position for use with minimum labor and tools and provides a rugged simple construction which will withstand the rigors of climate. While the invention may be applied to planes of any size, the application to medium and large size planes is limited by the fact that most such planes are kept in a hanger for storage.

In its more general aspects, the invention contemplates a circular channel of steel having the web disposed vertically and the opposed flanges extending inwardly and horizontally. The channel is rigidly secured in a level position upon the ground. A platform upon which the plane is mounted is carried by rollers which normally ride upon the bottom channel flange, the rollers each having a diameter less than the distance between opposed channel flanges. The two flanges are wide enough to function as roller tracks. The plane is rigidly secured to the platform and the platform can turn on the bottom channel flange to orient the plane into the wind. The reaction of the wings to wind is such as to endow the plane with buoyancy. Consequently, the effective weight of a plane on the turntable platform decreases as wind velocity increases so that turntable friction becomes a negligible factor in the response of the turntable to wind. Under some conditions of high wind, the plane might be elevated so that some or all platform rollers engage the top channel flange. The entire turntable structure is installed to be level and the circular channel functions not only as a turntable support but additionally as a housing for keeping earth and undesirable solid matter out.

While a structure employing the present invention may assume a wide variety of forms, the structure illustrated herein has the recommendation of being simple, easily packaged in broken down form and susceptible to being assembled with minimum labor and tools. For a complete description of the invention reference will now be made to the drawings wherein, FIGURE 1 is a plan view of an embodiment of the invention as installed.

FIGURE 2 is an enlarged plan view of one portion of the structure illustrated in FIGURE 1.

FIGURE 3 is a section on line 3—3 of FIGURE 1.

FIGURE 4 is a sectional detail on line 4—4 of FIGURE 2.

FIGURE 5 is a detail on line 5—5 of FIGURE 2.

FIGURE 6 is a section on line 6—6 of FIGURE 2.

As had been previously indicated, the invention generally comprises a turntable riding in a track suitably supported on the ground. A track consists of a channel, preferably of steel, having web 10 and top and bottom flanges 11 and 12. Channel 10 may be originally fabricated to have a generally circular shape with ends in abutting relation. Since a track structure will frequently have a diameter of the order to about 10 feet and may range as much as 20 or 25 feet in diameter, it is preferred to cut a curvilinear channel into a number of lengths which may be trucked or shipped to a customer without undue expense. As an example, a channel which is meant to have a track diameter of about 10 feet, will have a circumference of about 31.4 feet. Such a track may be divided into three easily handled lengths, each about ten and a fraction feet long. Adjacent ends of portions of track 10 can be bolted together by fixtures as illustrated in FIGURES 1, 3 and 5.

Each fixture consists of steel brackets 15 and 16 welded to the exterior of channel 10 at web 10 and lower flange 12. Brackets 15 and 16 may be provided with pin and slot means 18 for insuring that the two brackets will be correctly positioned for joining the ends of the track portions. Brackets 15 and 16 are provided with suitable apertures through which bolts and nuts 20 may extend for bolting the adjacent track portion ends together.

It is preferred to have the ends of flanges 11 and 12 abut to provide a smooth joint. An assembled track is supported upon concrete piers or footings 25 set in the ground. Such piers should be firmly anchored in the ground. Where freezing weather may be encountered, it is desirable to have such piers extend deep enough into the ground so that the bottom of each pier is below frost line. Thus, in many instances, piers having a length of the order of about 4 feet will be satisfactory. Each pier has disposed therein bolt 26 which extends through an opening in lug 27 of steel welded to bottom flange 12 of the track channel.

As a rule, it may be easier to drill a hole in a concrete pier just below the aperture in lug 27 and provide a conventional expanding type of bolt anchorage 28 within the concrete material for receiving a threaded end of bolt 26. This will make it unnecessary to attempt to predetermine locations of bolts in the various concrete piers with the accuracy required for accommodating lugs 27.

It is understood that the top surfaces of all piers 25 must be level so that the track as finally installed upon the tops of the piers will be level. The spacing between adjacent piers 25 will be determined by the weight of the plane to be handled, the type of ground involved and the stiffness of channel 10.

Generally it may be easier to locate the joints of adjacent ends of a track channel between piers. It is possible to have lug 27 attached to or form part of a junction plate fixtures so that the adjacent ends of a channel length can be disposed over a pier.

The entire turntable structure is carried on rollers disposed at intervals along the track. For most purposes, only four rollers 32 to 35 will be required. Each roller is supported on pin 38 rigidly secured to bracket 39 carried at the end of each each of four spider channels 41 to 44 inclusive. These spider channels extend radially inwardly of the turntable and meet at central region 46. Spider channels 41 to 44 inclusive may have a length depending upon the diameter of the turntable. Central region 46 where the inner ends of the spider channels meet is reinforced by four channels 48. Channels 48 are bolted at 49 to the various spider channels to provide a rigid strong structure.

To make it easier to assemble, the webs of the various spider channels have apertures 50 disposed at spaced intervals. These apertures will make it easier to attach flooring, to be described, on the turntable and will also tend to provide drainage for rain or snow which may fall upon the turntable. Rigidly secured to and supported by spider channels 42 and 44 are boards or planks 52 extending across these spiders and above the webs thereof. Planks 52 extend laterally from channels 42 and 44 to T steel support members 54 and 55. As shown in FIGURE 3, the T's are inverted with the head of the T extending below planks 52. The ends of planks 52 away from spider channels 42 and 44 are supported at flanges 57 of the inverted T's and are preferably bolted in position by bolts 58.

The ends of T's 54 and 55 are bolted or otherwise rigidly secured to generally circular channel 60. This channel may be in three or four sections and the top flange thereof provides a support upon which the ends of planks 22 can rest. As illustrated in FIGURE 4, the web of turntable channel 60 is not as wide as web 10 of the track channel. Consequently, the top of planks 52 can be generally level with top flange 11 of the track. This will facilitate rolling a plane on or off of the turntable.

Between inverted T's 54 and 55 and the edge of the turntable, additional planking or metal plates 62 are disposed. Such planking 62 rests on the top flange of turntable channel 60. Disposed above planking 62 and supported by the ends of spider channels 42 and 44 are expanded steel plates 64 and 65. These expanded plates are directly over spider channels 42 and 44 and the support provided by planks or steel plates 62 beneath expanded metal plate 64 and 65 is generally sufficient to carry the dead weight of the plane. In fact, the dotted outline of the plane wheels is indicated in FIGURE 1. Assuming that the plane has its front wheel above spider channel 43, it is clear that the weight of the plane insofar as the front wheel is concerned is directly carried by spider channel 43.

It is understood that a plane must be tied down to the turntable by suitable means thus, the open work in expanded metal members 64 and 65 is generally coarse enough to accommodate chain or rope to permit tieing the plane to the turntable. The turntable with a plane thereon will turn so that the plane heads into the wind. The friction of the turntable in track 10 may be too great for response to gentle wind. However, in the event that the wind velocity increases to a point where there might be danger to a plane unless it faced the wind, the lifting effect of the wind on the wings of the plane will be substantial enough so that the turntable will be pulled upwardly and reduce the friction of the turntable rollers in track 10 and thus will permit the plane to face into the wind quite accurately and to respond quickly to changes in wind direction.

To avoid the necessity for precision in mounting the turntable on track 10 and avoid the possibility of excessive lateral play of the turntable, it is desirable that a fixed turntable pivot axis be provided. Accordingly concrete pier 68 anchored in the ground is provided. Pier 68 has steel pivot pin 69 embedded therein. Pin 69 carries washer 70 loosely on the top face of pier 68. Pivot pin 69 extends high enough above pier 68 so that the top end of pin 69 will lie just below the top of the turntable. Above washer 70 is steel disc 72 carrying journal sleeve 73 rigidly attached thereto. Disc 72 is below the edges of the flanges of spider channels 41 to 44 inclusive and can support at least part of the turntable weight. The thickness of washer 70 (or a number of superposed washers) can be selected to determine the precise position of disc 72. Journal sleeve 73 has its top apertured to accommodate pin 69. The turntable can be anchored by a retaining pin passing through eye 75 of pivot pin 69. The retainer pin in eye 75 is accessible from the turntable top by having an aperture in planking 52 just above pivot pin 69. Disc 72 can be welded to the flange edges of the spider channels. By having journal sleeve 73 welded to disc 72, the turntable can be locked against lateral play. Thus locking or jamming of turntable rollers 32 to 35 inclusive is eliminated. Other means as flanged rollers instead of plain rollers 32 to 35 inclusive may be provided to control lateral turntable play. However, the arrangement disclosed provides support for the center of the turntable and permits the use of lighter spider channels.

Insofar as circular channel 10 is concerned, it may be desirable to select the channel arcuate length so that no joints occur at 180° intervals. Thus no oppositely disposed turntable rollers, as 32 and 34 for example, will be above two channel joints at one time.

What is claimed is:
1. An anchorage for a light plane comprising, when installed, a circular track having the shape of a channel with the web vertical and flanges horizontal inwardly, a platform for carrying a plane rigidly attached thereto and rollers carried by said platform positioned for normally riding upon the bottom flange of said channel, said rollers being disposed at spaced intervals along the track and each roller having a diameter less than the distance between opposed track flanges, said arrangement permitting the platform to turn on said track but locking the platform thereto, the buoyancy of a plane in response to wind reducing the effective weight upon said rollers and permitting the platform to turn with increasing ease as wind velocity, to which a plane is exposed, increases, said top flange preventing any roller from leaving the track.

2. An anchorage for a light plane comprising, when installed, a plurality of arcuate channels joined together to form a circular track, the channel having the web vertical and the flanges horizontal and extending inwardly, a circular turntable for carrying a plane, said turntable including a plurality of channels having the webs horizontal and flooring disposed above said turntable channels and being adapted to permit a plane to be rolled up over the turntable, said turntable having diametral channel structure, means supported by said diametral channel structure for supporting and for securing thereto two wheels of a plane, said plane having a third wheel forwardly of said first named wheels and being adapted to rest upon said turntable when the first named two wheels are disposed on the turntable, means including rollers rigidly secured to said turntable structure for supporting at least a portion of the weight of said turntable, said rollers having a sufficiently small diameter to enter between the two opposed flanges of the circular track, and means for supporting said rollers so that said rollers extend into said track channels so that every roller can ride upon the bottom flange of said track, the buoyancy of a plane in response to wind reducing the effective weight upon said rollers and permitting turntable response with increased ease as wind velocity increases, said top track flange retaining said rollers in said channel.

3. The construction according to claim 2 wherein means are provided for preventing lateral play of said turntable.

4. The construction according to claim 3 wherein added support means are below the center of said turntable and provide vertical and lateral support for said turntable.

5. The construction according to claim 4 wherein the edge of said turntable is provided with a turntable channel which is spaced inwardly from the track channel but wherein the turntable channel has a narrower web than the track channel web.

References Cited

UNITED STATES PATENTS

| | | | |
|---|---|---|---|
| 1,359,406 | 11/1920 | McCarty | 73—188 |
| 1,467,336 | 11/1923 | Rumfelt | 73—188 |
| 1,577,223 | 3/1926 | Glaze | 104—44 |
| 1,814,985 | 7/1931 | Florido | 244—114 |
| 2,044,031 | 6/1936 | Van Nieuwland | 104—44 |
| 2,598,505 | 5/1952 | Carmody | 73—188 |
| 3,040,674 | 6/1962 | Bolton | 104—44 |
| 3,170,411 | 2/1965 | Howard | 104—44 |
| 3,255,899 | 6/1966 | Mengal | 104—44 |

ARTHUR L. LA POINT, *Primary Examiner.*

D. F. WORTH, *Assistant Examiner.*